United States Patent [19]

Sieben

[11] Patent Number: 4,607,307
[45] Date of Patent: Aug. 19, 1986

[54] REEL BRAKING DEVICE FOR A MAGNETIC-TAPE CASSETTE

[75] Inventor: Joannes H. F. C. Sieben, Eindhoven, Netherlands

[73] Assignee: U.S. Philips Corporation, New York, N.Y.

[21] Appl. No.: 558,065

[22] Filed: Dec. 5, 1983

Related U.S. Application Data

[63] Continuation-in-part of Ser. No. 460,419, Jan. 24, 1983, abandoned.

[30] Foreign Application Priority Data

Dec. 10, 1982 [NL] Netherlands .................. 8204784

[51] Int. Cl.⁴ ............................................. G11B 23/02
[52] U.S. Cl. .................................. 360/132; 242/198; 242/199
[58] Field of Search .............. 360/132; 242/199, 198

[56] References Cited

U.S. PATENT DOCUMENTS

| | | | |
|---|---|---|---|
| 3,807,840 | 4/1974 | Cook et al. | 242/198 |
| 4,288,048 | 9/1981 | Sieben | 242/198 |
| 4,473,202 | 9/1984 | Verhoeven | 242/198 |
| 4,484,248 | 11/1984 | Ogiro | 360/132 |

FOREIGN PATENT DOCUMENTS 2020628 11/1979 United Kingdom .............. 360/132

Primary Examiner—John H. Wolff
Assistant Examiner—Matthew J. Bussan
Attorney, Agent, or Firm—David R. Treacy

[57] ABSTRACT

In a tape cassette having two flanged tape reels or spools arranged for rotation about parallel axes, when the cassette is removed from a tape recorder a brake device prevents rotation of the spools in a direction which will unwind the tape, and also tensions the tape. To facilitate assembly of the cassette, ratchet teeth are provided on both flanges of each spool, with the teeth on one flange oriented in a direction opposite to the teeth on the other flange. The spools are identical and can be interchanged, and each spool can be placed in the housing with either of its flanges uppermost. The brake device is symmetrical about an axis of symmetry, and has one pawl arranged to engage teeth on one spool upper flange, and the other pawl arranged to engage the other spool lower flange.

11 Claims, 4 Drawing Figures

REEL BRAKING DEVICE FOR A MAGNETIC-TAPE CASSETTE

This is a continuation-in-part of application Ser. No. 460,419 filed Jan. 24, 1983, now abandoned.

The invention relates to a magnetic-tape cassette comprising a housing having parallel first and second major walls and a plurality of peripheral walls extending between the major walls, and two tape reels or spools which are arranged in the housing for rotation about parallel axes perpendicular to the major walls and on which is wound a magnetic tape. A portion of the tape extending between the spools passes across the front of the housing for cooperation with a part or parts of a recording and/or playback apparatus, such apparatus being referred to hereinafter as a tape recorder. Each tape spool is rotatable in one direction for winding the tape onto that spool and in the opposite direction for unwinding the tape from that spool. Each spool has a hub with a first flange at the end of the hub which is nearer the first major wall and a second flange at the other end of the hub, the spools being supported in the housing in positions such that the first flanges of the two spools lie substantially in a first plane parallel with the planes of the major walls and the second flanges lie substantially in a second plane parallel with the planes of the major.

Cassettes of this type usually include a brake device for the tape spools, to prevent tape spillage off the spools when not in use. The device comprises a first pawl which is cooperable with ratchet teeth on the periphery of the first flange of one of the spools and a second pawl which is cooperable with ratchet teeth on the periphery of the second flange of the other spool, the teeth on the two flanges being oriented in opposite directions about the axes of rotation of the spools, viewed from the same side of the spools. The pawls are carried by a mount which is slidably guided in the housing for movement, in a direction perpendicular to a plane containing the axes of rotation of the spools, between an inoperative position in which the first and second pawls are disengaged from the ratchet teeth on the respective first and second flanges on the tape spools to permit rotation of the spools to wind the tape onto one spool and unwind it from the other, and an operative position in which each pawl engages a tooth on the respective first or second flange to prevent rotation of the spool comprising that flanges in a direction to unwind the tape from that spool. The mount is urged by spring means towards the operative position, and is arranged during movement from the inoperative position to the operative position to bring each pawl into engagement with a tooth on the respective first or second flange and then to move the pawls so as to rotate each spool through a limited angle in a direction which winds the tape onto the spools and tensions the portion of the tape which extends between the spools.

Such a cassette is disclosed in British Patent Specification No. 2 114 952A. This specification teaches an arrangement in which one flange of each tape spool is provided with ratchet teeth around its periphery and the other flange has no teeth and therefore a slightly smaller diameter. A drawback of this arrangement is that, during assembly of the cassette, the two spools of the cassette cannot be interchanged without inverting them. Consequently, on a production line two flows of spools are required, one with the toothed flanges of the spools at the top and the other with the toothed flanges at the bottom. This necessitates vigilance on the part of the operator to ensure that the spools from the two flows are placed in the correct positions in the cassette housings. To check this optically during assembly is difficult since the flanges are usally all transparent.

British Specification No. 2,114,852A mentions the possibility of providing ratchet teeth on both flanges of each spool and constructing each pawl to cooperate with the teeth on both flanges of the associated spool. Since this alternative would require the teeth on both flanges of each spool to be oriented in the same direction about the axis of the spool, viewed from the same side of the spool, it would still not be possible to interchange the spools without inverting them.

SUMMARY OF THE INVENTION

It is an object of the invention to provide a magnetic-tape cassette which does not require two different spool flows to the assembly point.

According to the invention the flanges of the spools all have the same diameter and ratchet teeth are provided on both flanges of each spool, with the teeth on one flange oriented in the opposite direction about the axis of rotation of the spool to the teeth on the other flange, viewed from the same side of the spool.

This arrangement of ratchet teeth on both flanges of each tape spool, with the teeth on one flange of each spool oriented in the opposite direction to the teeth on the other flange, greatly facilitates the assembly of the cassette, since it allows each spool to be placed in the cassette housing with either of its flanges uppermost, and the two spools can be interchanged without having to be inverted. The spools can thus be supplied in one flow on a production line and there is no danger of spools being incorrectly positioned in the cassette housings.

Assembly of the cassette is further facilitated with an embodiment of the invention in which the spools have a limited freedom of axial movement in the housing, and in which the brake device is constructed to be symmetrical in any plane of an infinite number of planes which all intersect one another along an axis of symmetry which is defined by the intersection of a third plane extending parallel with the planes of the major walls of the housing and lying midway between the limits of axial movement of the spools, and a fourth plane which is perpendicular to the third plane and to the plane containing the axes of rotation of the spools and which lies midway between these axes of rotation. As a result of this symmetry, each pawl can serve as either the first pawl or the second pawl, so that inversion of the brake device in the housing has no effect on its operation.

The mount for the pawls of the brake device may have two surfaces which are mirror images of one another with respect to said third plane and which are inclined to the direction of movement of the mount, and an aperture may be provided in one of the major walls of the housing in a position such that when the cassette is moved onto a tape recorder, in a direction perpendicular to the planes of the major walls, a member projecting from the apparatus can enter the cassette housing through the aperture and cooperate with one of the inclined surfaces to displace the mount from the operative (brake engaged) to the inoperative position.

The mount of the brake device may be supported by two members which are connected one to each of the major walls of the housing and between which are formed guide slots which are symmetrical about third plane and extend perpendicularly to the plane containing the axes of rotation of the spools, the mount being formed with ridges which are slidable in these slots for guiding the mount in its movement between the operative and inoperative positions. This construction further facilitates the mounting of the brake device in the cassette housing and also provides both a simple form of guidance for the mount and a simple means of ensuring accurate positioning of the brake device in the direction perpendicular to the flanges of the tape spools.

The first and second pawls may be movable relative to the mount and against spring force in directions away from the respective first and second flanges of the tape spools and parallel to the planes of the major walls of the housing, and control surfaces for cooperation with the pawls may be formed on further members which are connected to the major walls of the housing. Preferably, the pawls have projections which, during movement of the mount from the operative to the inoperative position, cooperate with the control surfaces to cause movement of the pawls relative to the mount in the directions away from the respective first and second flanges of the spools. By forming these control surfaces on members which are connected to the major walls of the housing, the number of operations required in the assembly of the cassette is reduced.

Between the supporting members and the further members two openings may be formed through each of which one of the pawls extends. Each of the openings has a wall which forms one of the control surfaces and further walls which inhibit displacement of the respective pawl in directions transverse to the first or second plane respectively.

The pawls may have the form of spring blades and be connected to the mount at a far side thereof which is remote from the plane containing the axes of rotation of the spools, the pawls extending towards this plane from the far side of the mount.

The pawls may be formed integrally with the spring means which urge the mount towards the operative position, or they may be formed integrally with the mount from a plastic material.

An embodiment of the invention will be described with reference to the accompanying drawings.

DESCRIPTION OF THE PREFERRED EMBODIMENT

Figure 1:
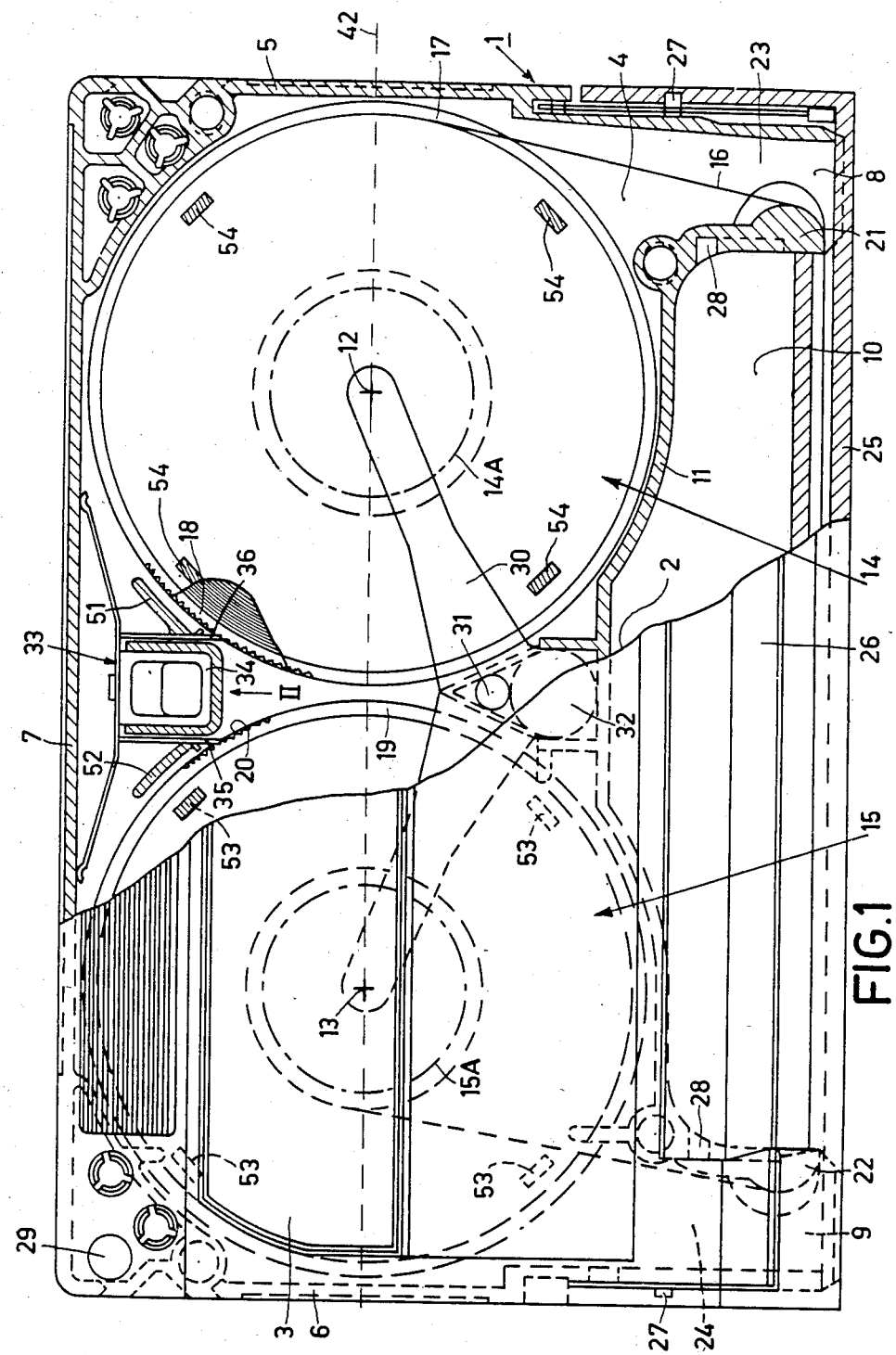
FIG. 1 is a plan view, partly in section, of a video tape cassette according to the invention.

The magnetic-tape cassette shown in FIG. 1 comprises a housing having an upper part or lid which comprises a first or upper substantially rectangular major wall 2 formed with a window 3 which extends over almost the entire length of the housing, and a lower part which comprises a second substantially rectangular major wall 4 extending in a plane parallel with the plane of the first major wall 2. The housing also has peripheral walls, including two side walls 5 and 6 and a rear wall 7, which extend between the major walls 2 and 4 and which are formed integrally with the upper major wall 2. The upper and lower parts of the housing, including the window 3, may be injection-molded from a suitable plastic material. In the front of the housing, apertures 8 and 9 respectively are adjacent the front ends of the side walls 5 and 6.

Also in the front of the housing, between the apertures 8 and 9, is a recess 10, which in this embodiment is formed by recesses in the front edges of the major walls 2 and 4. The recess 10 is bounded by a wall 11 which extends between the major walls 2 and 4, in order to inhibit ingress of dust or other contaminants into the interior of the housing and to give the housing adequate flexural strength.

Inside the housing 1 are two flanged tape reels or spools 14 and 15 which are arranged adjacent each other between the major walls 2 and 4 and are rotatable about axes 12 and 13 respectively which extend perpendicularly to the major walls. The lower major wall 4 is provided with the usual openings through which the spools can be driven by drive means (not shown) on a tape recorder. A magnetic tape 16, is connected at its ends to the hubs of the spools 14 and 15 and is wound round these hubs, which are designated 14A and 15A respectively. When the spools are simultaneously rotated in the clockwise direction, as viewed from the upper side of the spools in FIG. 1, tape is unwound from the spool 14 and wound onto the spool 15, and when the spools are rotated in the counter-clockwise direction tape is unwound from the spool 15 and wound onto the spool 14.

Each of the spools 14 and 15 has a flange 17, 19 respectively at the upper end of its hub 14A, 15A respectively and a flange 18, 20 respectively at the lower end of its hub. The spools are supported on the lower wall 4 of the housing 1 with the two upper flanges 17 and 19 lying substantially in a common plane and the two lower flanges 18 and 20 likewise lying substantially in a common plane, the two planes being parallel with the planes of the major walls 2 and 4 of the housing. The flanges 17, 18, 19 and 20 all have the same diameter and are rigidly connected to the respective spool hubs. The upper flanges 17 and 19 are made of a transparent material so that tape wound on the spools is visible through these flanges and through the window 3 in the upper wall 2 of the housing. To make the tape more visible or conspicuous the lower flanges 18 and 20 can be made of an opaque material, for example, a white plastic material.

Each of the flanges 17, 18, 19 and 20 is provided with ratchet teeth around the whole of its circular periphery. Each ratchet tooth has a flank which extends substantially radially of the respective flange and a flank which extends substantially tangentially of an imaginary circle concentric with the flange. The arrangement of the teeth on the four flanges is such that the teeth on the upper flanges 17 and 19, viewed from the same side of these flanges, are oriented in the same first direction about the rotational axes 12 and 13 of the spools, and the teeth on the lower flanges 18 and 20, viewed from the same side of these flanges, are oriented in a same second direction about the axes 12 and 13. The second direction is opposite to the first direction of orientation of the teeth on the upper flanges, viewed from the same side of the spools. In the arrangement shown in FIGS. 1 and 3, the teeth on the upper flanges 17 and 18 have their radially extending flanks facing in the counter-clockwise direction about the axes 12 and 13 viewed from the upper side of the spools, and the teeth on the lower flanges 18 and 20 have their radially extending flanks facing in the clockwise direction viewed from the upper side of the spools.

At the ends of the wall 11 of the recess 10 in the front of the housing 1 two fixed tape supports 21 and 22 bound the inner sides of the apertures 8 and 9 respectively. The apertures are each bounded at the opposite, outer side by the front end of the side wall 5 and 6 respectively of the housing. Passages 23 and 24 in the housing terminate at the apertures 8 and 9 respectively, and through these passages and apertures a portion of the tape 16 which extends between the spools 14 and 15 leaves and re-enters the housing. When the cassette is not in use, this portion of the tape extends tautly across the front of the housing between the tape supports 21 and 22.

The passages 23 and 24 are entirely free of any guide means for the tape, so that between the spools the tape touches only the tape supports 21 and 22. These supports are operative only when the cassette is not in use. They thus have only a passive function, namely, to support the portion of the tape which extends across the front of the cassette housing at the location of the recess 10. This portion of the tape is protected by two covers which are pivotally connected to the cassette housing, namely, an outer cover 25 which shields the tape 16 at the front side thereof and an inner cover 26 which shields the tape in the recess 10 at the rear side of the tape. By means of pins 27 the cover 25 is pivotally connected to the side walls 5 and 6 of the housing 1. The inner cover 26 comprises pivot pins (not shown) which slide along and turn in guide grooves 25 in the wall 11. The covers 25 and 26 are coupled to each other, in such a way (not shown) that when the cover 25 is swung open the inner cover 26 also is swung open.

Near its two rear corners the housing 1 is formed with a plurality of detection apertures which can be sensed by sensing means on a tape recorder. These apertures may be used for detecting, for example, the type of tape, contained in the cassette, the operating speed of the tape, the tape length and whether the magnetic tape carries a prerecording. For this purpose a detection aperture 29 is formed which can be opened or closed by means of a slide, not shown.

A bifurcated leaf spring 30 which is attached to the inner side of the upper wall 2 of the housing 1 at a location 31, equidistant from the spool axes, presses downwardly on the tape spools 14 and 15 to urge them against the lower wall 4 of the housing. The spools have a slight freedom of axial movement in the housing 1 so that they can be lifted off the lower wall 4 against the action of the spring 30 by the drive means of a tape cassette apparatus when the cassette is placed in position on the apparatus. This freedom of movement is limited by the lower wall 4 of the housing and by projections 53 and 54 formed on the inner side of the upper wall 2.

The lower wall 4 is formed with a circular aperture 32 to receive light from a source on the tape recorder. The purpose of this light source is to emit a beam towards the side walls 5 and 6 of the cassette housing for detection outside the cassette by a photosensitive cell in the recorder. When a transparent end portion of the tape passes between the photosensitive cell and the light source, the apparatus is automatically stopped.

Figure 2:
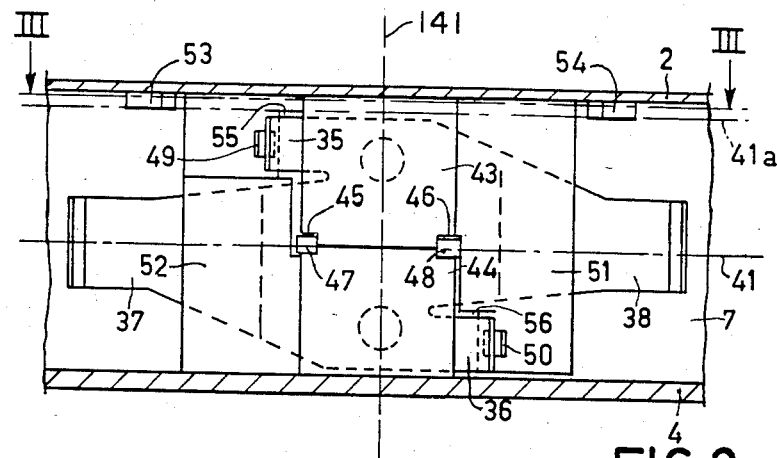
FIG. 2 is a fragmentary sectional view looking in the direction of the arrow II in FIG. 1, showing the brake device but omitting the tape spools in the interests of clarity.
Figure 3:
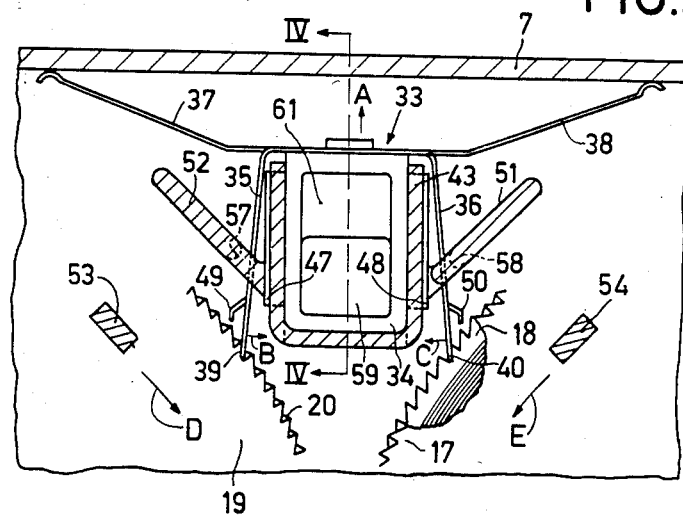
FIG. 3 is a sectional plan view taken on the line III—III in FIG. 2.
Figure 4:
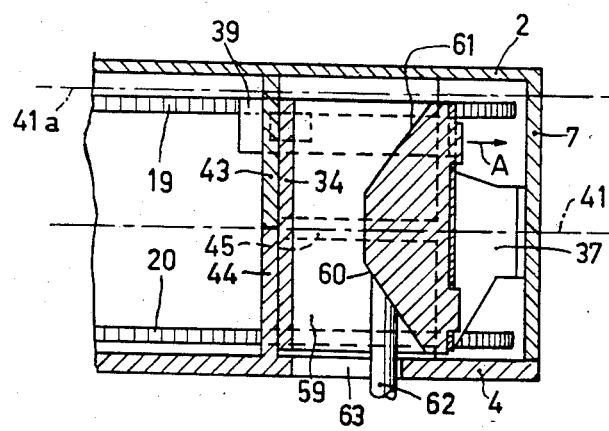
FIG. 4 is a sectional view taken on the line IV—IV in FIG. 3.

As is shown in more detail in FIGS. 2 to 4, the cassette comprises a brake device 33 for the tape spools. This device includes two pawls 35 and 36 which are cooperable with the ratchet teeth on the upper flange 19 of the spool 15 and the ratchet teeth on the lower flange 18 of the spool 14 respectively. The pawls are carried by a mount 34 which is situated in an area of the housing 1 lying between the spools 14 and 15 and between the rear wall 7 of the housing and a plane 42 (FIG. 1), containing the rotational axes 12 and 13 of the spools. The mount 34 is movable in this area in directions away from and towards the wall 7 between an inoperative position in which the pawls 35 and 36 are disengaged from the ratchet teeth on the respective spool flanges to permit free rotation of the spools, an an operative position (shown in FIGS. 1 and 3) in which the pawls 35 and 36 each engage a tooth on the spool flanges 19 and 18 respectively to prevent rotation of the spools 15 and 14 respectively in directions to unwind tape from the spools.

The pawls have the form of spring blades. They are disposed one of each of two opposite sides of the mount 34 and are each connected at one end to the mount at the side thereof which faces the rear wall 7 of the housing. The pawls extend forwardly from this side of the mount, parallel to the upper and lower walls 2 and 4 of the housing, and at their forward ends 39 and 40 respectively are free for engagement with the teeth on the spool flanges 19 and 18. The pawl 35 is disposed close to the upper wall 2 of the housing and the pawl 36 is disposed close to the lower wall 4.

The mount 34 is urged towards the operative position by spring means which in the preferred embodiment are formed integrally with the pawls 35 and 36 from resilient sheet metal and comprise a central portion which is riveted to the rear side of the mount 34 and two resilient limbs 37 and 38 which extend in opposite directions from the central portion and at their distal ends bear against the rear wall 7 of the housing. The entire brake device 33, consisting of the mount 34, which may be made of a plastic material, and the one-piece component comprising the spring means 37, 38 and the pawls 35 and 36, is pole-symmetrical about an axis of symmetry; i.e., symmetrical in any plane of an infinite number of planes, which all intersect one another along a given axis of symmetry. In this case the axis of symmetry is defined by the intersection of a first plane 41 (FIGS. 2 and 4) extending parallel with the planes of the upper and lower walls 2 and 4 of the housing 1 and lying midway between the wall 4 and a plane 41a contiguous with those surfaces of the projections 53 and 54 which act to limit the freedom of axial movement of the tape spools in the upper direction, and a second plane 141. The plane 141 bisects the cassette perpendicular to the first plane 41 and to a plane 42 containing the rotational axes 12 and 13 of the spools. In particular, plane 141 lies midway between these axes.

The major walls 2 and 4 of the housing carry members 43 and 44 respectively for supporting the mount 34. These members are preferably integral with the major walls and abut each other in the plane 41. As shown in FIG. 3, the supporting members 43 and 44 are U-shaped. As shown in FIG. 2, between the side walls of the two members two slots 45 and 46 each symmetrical about the plane 41 extend perpendicularly to the plane 42; that is, they extend in a front-to-back direction. Ridges 47 and 48 on the mount 34 slide in these slots to provide guidance for the mount, so that as it moves between the inoperative and operative positions it follows an accurately defined straight path perpendicular to the plane 42 and is positioned correctly while in the operative position. This positioning is important in order to ensure that the free ends 39 and 40 of the pawls 35 and 36 can correctly engage the ratchet teeth on the spool flanges 19 and 18.

Near their free ends 39 and 40 the pawls 35 and 36 comprise projections 49 and 50 respectively, which extend obliquely outwards from the pawls towards the axes of rotation 13 and 12 of the spools 15 and 14 respectively and at their free ends extend substantially parallel to the pawls 35 and 36 respectively. As shown in FIG. 3, in the engaged positions of the pawls the free ends of the projections 49 and 50 are just out of the range of the ratchet teeth on the spool flanges 19 and 18.

Extending between the upper and lower walls 2 and 4 of the housing 1, adjacent the supporting members 43 and 44 at the sides thereof, are a member 51 formed wholly on the upper wall 2, and a member 52 formed partly on the upper wall 2 and partly on the lower wall 4. The members 51 and 52 and the supporting members 44 and 43 respectively define openings 56 and 55, through which the pawls 36 and 35 pass respectively. Respective walls 57 and 58 of the openings 55 and 56, which face the supporting members 43 and 44 respectively, form control surfaces. During movement of the mount 34 in the direction of the arrow A (FIG. 3) from the operative position, to the inoperative position to disengage the pawls 35 and 36 from the ratchet teeth on the spool flanges 19 and 18 respectively, the control surfaces of the walls 57 and 58 cooperate with the projections 49 and 50 respectively on the pawls to deflect the pawls inwardly against their own spring force towards the mount 34 in the directions of the arrows B and C. As a result of these movements the free ends 39 and 40 of the pawls are moved well clear of the ratchet teeth on the spool flanges 19 and 18 and consequently cannot interfere with the rotation of the spools.

The mount 34 is moved in the direction of the arrow A by cooperation between an inclined surface 60 (FIG. 4) on the mount and a pin 62 on the tape recorder when the cassette is placed on the apparatus. The surface 60 is inclined to the direction of movement of the mount 34 and forms the rear wall of an opening 59 which extends right through the mount. As the cassette is moved downwards onto the cassette apparatus, the pin 62 on the apparatus enters the opening 59 in the mount through a slot 63 in the lower wall 4 of the cassette housing, and an inclined surface on the upper end of the pin 62 engages the inclined surface 60 on the mount and cooperates therewith to displace the mount rearwardly (to the right in FIG. 4) from the operative to the inoperative position. A second inclined surface 61 which is a mirror image on the surface 60 with respect to the plane 41 is provided on the rear wall of the opening 59 in the mount at the opposite end of the opening from the surface 60 to preserve the symmetry of the brake device 33. Instead of having a fixed pin 62 for cooperation with the lower of the two inclined surfaces on the mount 34, a pin may be provided on the cassette apparatus which is long enough to engage the rear wall of the opening 59 in the mount between the inclined surfaces 60 and 61 and which, when such engagement has been effected, can be moved rearwardly to displace the mount in the direction of the arrow A.

When the cassette is removed from the cassette apparatus and the mount 34 is consequently no longer held back by the pin 62, and mount moves forward to the operative position (FIG. 3) under the influence of the spring means 37, 38. During the initial part of this movement the projections 49 and 50 on the pawls 35 and 36 move off the control surfaces 57 and 58 respectively and the pawls immediately spring outwardly away from the mount 34 and rapidly engage the ratchet teeth on the spool flanges 19 and 18 respectively. During the remainder of the forward movement of the mount 34 the pawls 35 and 36 act on the respective ratchet teeth to impart a rotational movement to each of the spools 15 and 14 respectively on the direction of the arrows D and E respectively, which is the direction in which tape is wound onto the respective spool, so that the portion of the tape 16 which extends between the spools is tensioned. The large amount of deflection of the pawls 35 and 36 allows a correspondingly large rotational movement to be imparted to the spools before the mount 34 reaches the limit of forward movement determined by the supporting members 43 and 44. Without the projections 49 and 50 on the pawls, such a large deflection would leave the free ends 39 and 40 of the pawls close to the ratchet teeth on the spool flanges 19 and 18 in the inoperative position of the mount 34, and would necessitate close tolerances in the lateral positioning of the spools in the housing 1 to ensure reliable operation. The undesirable need for tight fitting of the spools is avoided by the provision of the projections 49 and 50 on the pawls, which deflect the pawls well away from the spool flanges 19 and 18 during the final part of the movement of the mount 34 to the inoperative position. In the operative position of the mount the pawls 35 and 36 lock the spools 15 and 14 respectively against rotation in the directions which would unwind tape from the spools, because such rotation would produce undesirable slackening of the tape between the spools.

Due to their thinness and consequent torsional flexibility there is a possibility that the pawls may be distorted by their interaction with the ratchet teeth into positions in which their free ends 39 and 40 slip above or below the spool flanges 19 and 18. To prevent this the openings 55 and 56 through which the pawls extend have walls at the top and bottom which maintain the pawls in the correct positions in directions transverse to the planes of the spool flanges 19 and 18. The bottom wall of the opening 56 is formed by the lower wall 4 of the housing 1. This risk of distortion of the pawls is reduced in a modification of the brake device 33 in which the pawls are made of a plastic material and are formed integrally with the mount 34.

The assembly of the cassette is greatly facilitated by the particular arrangement of the ratchet teeth on the flanges of the tape spools, whereby the teeth on one flange of each spool are oriented in the opposite direction to the teeth on the other flange, in combination with the arrangement of the two pawls, one for cooperation with the ratchet teeth on the upper flange of one spool and the other for cooperation with the ratchet teeth on the lower flange of the other spool. As a result of this, each spool can be arranged in the cassette housing with either of its flanges uppermost, and the two identical spools are interchangeable, with or without inversion of either spool. Assembly is further facilitated by the axial or polar symmetry of the brake device 33, which allows the device to be placed in the housing in the position shown or in an inverted position with the pawl 36 adjacent the upper wall 2 of the housing and the pawl 35 adjacent the lower wall 4. The construction of the guide means for the mount 34 of the braking device, namely, the guide slots 45 and 46 and the ridges 47 and 48 cooperating therewith, also simplify the mounting of the brake device in the housing.

The above magnetic-tape cassette is very suitable for mass-production as a comparatively small cassette for use in portable video tape recorders, such as those used in conjunction with video cameras.

Obviously, the invention is not limited to video cassettes; it is equally applicable to audio cassettes.

What is claimed is:

1. A magnetic-tape cassette comprising:
   a housing having two parallel substantially rectangular major walls, two side walls, a rear wall, and a front wall having at least one aperture formed therein,
   two spool hubs arranged adjacent each other between the major walls, and each rotatable about a respective axis of rotation which extends perpendicularly to said major walls, each of said spool hubs having a respective upper and lower flange disposed near a respective upper and lower axial end of the spool hub, the upper and the lower flanges respectively being disposed in an upper and a lower plane, an upper flange on one spool hub and a lower flange on the other spool hub having a multiplicity of ratchet teeth,
   a length of magnetic tape connected to and at least partly wound on the spool hubs in the space between the respective flanges, and having a portion extending along said at least one front aperture,
   a braking device comprising a mount and two brake arms arranged on the mount, each brake arm having a respective free end disposed respectively near said first and second major walls for respective cooperation with the toothed flange of the first and second spool hub,
   means for mounting said braking device between said major walls for actuation by an actuating means arranged externally of the cassette housing on a tape recorder, said means for mounting including means for guiding the mount inside the housing in a space bounded by the spools and the rear wall so as to be slidable in a direction perpendicular to said rear wall between a disengaged position and an engaged position; in said disengaged position the free end of each brake arm being disengaged from the respective toothed flange; in the engaged position the mount being disposed at a greater distance from the rear wall than in the disengaged position, and the free end of each brake arm being in engagement with a respective tooth of said ratchet teeth to inhibit rotation of the spools, and
   spring means for moving said mount from the disengaged to the engaged position, thereby causing engagement of the brake arm free ends with respective teeth to cause the spools to rotate in opposite winding directions, whereby the magnetic tape is tensioned,
   characterized in that said housing comprises two supporting members connected to at least one of said major walls, each supporting member having a wall portion surrounding a respective bore, the wall portion about the bore forming a respective control surface,
   said brake arms each include a respective projection near the brake arm free end, each brake arm extending through a respective bore and arranged such that the arm engages the respective control surface as the mount is moved from the engaged to the disengaged position so as to move each of the arms toward the mount.

2. A cassette as claimed in claim 1, characterized in that said means for mounting includes at least two slots formed in said supporting members and extending parallel to the major walls, and said mount comprises guide ridges which are guided in said slots.

3. A magnetic-tape cassette comprising:
   a housing having two parallel substantially rectangular major walls, two side walls, a rear wall, and a front wall having at least one aperture formed therein,
   two spool hubs arranged adjacent each other between the major walls, and each rotatable about a respective axis of rotation which extends perpendicularly to said major walls, each of said spool hubs having a respective upper and lower flange disposed near a respective upper and lower axial end of the spool hub, the upper and the lower flanges respectively being disposed in an upper and a lower plane, an upper flange on one spool hub and a lower flange on the other spool hub having a multiplicity of ratchet teeth,
   a length of magnetic tape connected to and at least partly wound on the spool hubs in the space between the respective flanges, and having a portion extending along said at least one front aperture,
   a braking device comprising a mount and two brake arms arranged on the mount, each brake arm having a respective free end disposed respectively near said first and second major walls for respective cooperation with the toothed flange of the first and second spool hub,
   means for mounting said braking device between said major walls for actuation by an actuating means arranged externally of the cassette housing on a tape recorder, said means for mounting including means for guiding the mount inside the housing in a space bounded by the spools and the rear wall so as to be slidable in a direction perpendicular to said rear wall between a disengaged position and an engaged position; in said disengaged position the free end of each brake arm being disengaged from the respective flange; in the engaged position the mount being disposed at a greater distance from the rear wall than in the disengaged position, and the free end of each brake arm being in engagement with a respective tooth of said ratchet teeth to inhibit rotation of the spools, and
   spring means for moving said mount from the disengaged to the engaged position, thereby causing engagement of the brake arm free ends with respective teeth to cause the spools to rotate in opposite winding directions, whereby the magnetic tape is tensioned,
   characterized in that said flanges at each axial end of each spool hub have the same diameter and have ratchet teeth, the teeth on one flange being oriented opposite to those on the other flange of the same spool hub, and
   each of the flanges which is disposed in a same plane has similarly oriented ratchet teeth,
   whereby the cassette can be assembled from interchangeable first and second spool hubs, with either flange of a spool hub being oriented as the upper flange.

4. A cassette as claimed in claim 3, characterized in that the cassette includes upper and lower surfaces for limiting axial play of the spools, and the braking device comprises two halves arranged mirror-symmetrically relative to a plane of symmetry which is disposed at equal distances from said upper and lower surfaces and extends perpendicularly to a plane in which the axes of rotation lie.

5. A cassette as claimed in claim 4, in which said mount includes two oblique surfaces disposed at an acute angle relative to said major walls and arranged to be engageable by actuating means of a magnetic-tape-cassette apparatus for moving the mount, characterized in that the mount is formed with a continuous recess extending substantially perpendicularly to the major walls, said recess having two end portions arranged symmetrically about a central portion, said oblique surfaces forming rear walls of respective end portions of the recess and extending from said central portion of the recess in a direction toward said rear wall and respective major wall.

6. A cassette as claimed in any one of claims 1-5, characterized in that said brake arms are made of a strip of resilient material connected to the mount at a side of the mount facing the rear wall.

7. A cassette as claimed in claim 6, characterized in that said spring means and said brake arms are portions of one unitary piece of resilient material.

8. A cassette as claimed in claim 6, characterized in that said brake arms are formed of a plastic material integral with said mount.

9. a cassette as claimed in any one of claims 1-5, characterized in that the two spool hubs are of identical construction.

10. A cassette as claimed in claim 9, characterized in that each of said spool hubs has a lower flange formed of a non-transparent material.

11. A cassette as claimed in claim 4, characterized in that said housing is formed by an upper part which includes an upper wall which is one of said major walls, and a lower part which includes a lower wall which is the other of said major walls; said lower wall has an inner surface which is said lower surface; and the upper part includes projections formed on an inner side of the upper wall, respectively arranged opposite the upper flanges of the respective spools, said upper surfaces being formed on said projections.

* * * * *